United States Patent
Fogel et al.

(10) Patent No.: US 10,691,657 B2
(45) Date of Patent: Jun. 23, 2020

(54) SYSTEM AND METHOD FOR MANAGING A DATABASE HAVING A SIZE LIMIT

(71) Applicant: InterMetro Communications, Inc., Simi Valley, CA (US)

(72) Inventors: Christopher Fogel, Simi Valley, CA (US); Charles Rice, Simi Valley, CA (US)

(73) Assignee: INTERMETRO COMMUNICATIONS, INC., Simi Valley, CA (US)

( * ) Notice: Subject to any disclaimer, the term of this patent is extended or adjusted under 35 U.S.C. 154(b) by 254 days.

(21) Appl. No.: 15/465,329

(22) Filed: Mar. 21, 2017

(65) Prior Publication Data

US 2018/0276255 A1    Sep. 27, 2018

(51) Int. Cl.
| | | |
|---|---|---|
| G06F 16/00 | (2019.01) | |
| G06F 16/21 | (2019.01) | |
| H04M 3/42 | (2006.01) | |
| G06F 16/23 | (2019.01) | |
| G06F 16/22 | (2019.01) | |
| H04M 15/00 | (2006.01) | |
| H04M 15/08 | (2006.01) | |

(52) U.S. Cl.
CPC .......... *G06F 16/217* (2019.01); *G06F 16/211* (2019.01); *G06F 16/2282* (2019.01); *G06F 16/235* (2019.01); *H04M 3/42306* (2013.01); *H04M 15/00* (2013.01); *H04M 15/08* (2013.01); *H04M 15/58* (2013.01); *H04M 15/8044* (2013.01); *H04M 2203/15* (2013.01); *H04M 2203/558* (2013.01)

(58) Field of Classification Search
CPC ......... G06F 16/20–2393; G06F 16/211; G06F 16/217; G06F 16/2282; G06F 16/235
USPC .................................................. 707/600–899
See application file for complete search history.

(56) References Cited

U.S. PATENT DOCUMENTS

| | | | | |
|---|---|---|---|---|
| 5,758,150 | A | 5/1998 | Bell et al. | |
| 6,002,757 | A * | 12/1999 | Williams | H04Q 3/0016 370/385 |
| 6,097,801 | A * | 8/2000 | Williams | H04Q 3/0016 370/385 |
| 6,957,225 | B1 * | 10/2005 | Zait | G06F 16/2264 |
| 7,707,143 | B2 * | 4/2010 | Bruce | G06F 16/283 707/999.003 |

(Continued)

OTHER PUBLICATIONS

International Search Report and Written Opinion in PCT/US2018/18/23092 dated May 23, 2018.

*Primary Examiner* — Michelle N Owyang
(74) *Attorney, Agent, or Firm* — Knobbe, Martens, Olson & Bear LLP

(57) ABSTRACT

A system for updating a database having a size limit is disclosed. The system can dynamically update a table associated with a given call destination based on historical call data associated with the given call destination. The database may specify a size limit on the table (e.g., the number of database entries the table can include, which may depend on the sizes of the individual database entries) associated with each call destination. The system can generate a number of database entries that would satisfy the size limit based on the historical call data and the carrier data associated with a plurality of carriers that may be used to route the calls made to the call destination and insert the generated database entries into the database.

20 Claims, 5 Drawing Sheets

(56) References Cited

U.S. PATENT DOCUMENTS

| | | | |
|---|---|---|---|
| 7,711,692 B2* | 5/2010 | Froehlich | G06F 16/24544 |
| 9,582,524 B1* | 2/2017 | Murali | G06F 16/214 |
| 9,774,731 B1* | 9/2017 | Haltom | H04M 3/4365 |
| 10,102,230 B1* | 10/2018 | Muniswamy Reddy | G06F 16/2228 |
| 2003/0026262 A1* | 2/2003 | Jarl | H04L 12/5601 370/394 |
| 2005/0078814 A1 | 4/2005 | Cavalcanti | |
| 2006/0034267 A1* | 2/2006 | Torrey | H04M 3/4228 370/360 |
| 2007/0240196 A1 | 10/2007 | Lin | |
| 2014/0047040 A1 | 2/2014 | Patiejunas et al. | |
| 2014/0188906 A1* | 7/2014 | Muller | G06F 16/2282 707/752 |
| 2016/0188419 A1* | 6/2016 | Dagar | G06F 11/1451 707/654 |
| 2016/0378845 A1 | 12/2016 | Sivasubramanian et al. | |

* cited by examiner 1-800-AAAAAAA

| LATA | AREA | TIME OF DAY | DAY OF WEEK | CARRIER | DESTINATION |
|---|---|---|---|---|---|
| 730 | 310 | DAY | | TELCO A | 310-001-2345 |
| 730 | 310 | NIGHT | | TELCO C | 310-001-2345 |
| 730 | OTHER | | WEEKDAY | TELCO C | 310-001-2345 |
| 730 | OTHER | | WEEKEND | TELCO B | 310-001-2345 |
| OTHER | | | | TELCO C | 310-001-2345 |

1-800-BBBBBBB

| LATA | AREA | TIME OF DAY | DAY OF WEEK | CARRIER | ANNOUNCEMENT | DESTINATION |
|---|---|---|---|---|---|---|
| 730 | 310 | DAY | | TELCO A | | 818-009-8765 |
| 730 | 310 | NIGHT | | | "Not in service" | |
| OTHER | | | WEEKDAY | TELCO B | | 818-009-8765 |
| OTHER | | | WEEKEND | TELCO B | | 212-123-4567 |

SYSTEM AND METHOD FOR MANAGING A DATABASE HAVING A SIZE LIMIT

INCORPORATION BY REFERENCE

The disclosure of U.S. application Ser. No. 13/367,133, filed on Feb. 6, 2012, titled "SYSTEM AND METHOD FOR DYNAMIC MULTIFACTOR ROUTING," is hereby incorporated by reference in its entirety.

BACKGROUND

A phone call or communications service, such as fax, or voice-messaging, typically involves multiple communications carriers. This is typically true regardless of whether the call involves traditional landlines, cellular phones, or Voice over Internet Protocol (VoIP) services. In order to utilize such services, a calling party typically subscribes to one of the communications carriers and pays for initiating (and sometimes receiving) calls according to a calling plan offered by the communications carrier.

In some cases, the routing of such calls may be implemented using one or more databases. For example, such databases may detail how a given call should be routed (e.g., to which destination number via which communications carrier). Each time a call is made, the communications carrier handling the call may refer to such databases and route the call accordingly. However, in some cases, such a database may have a size limit that restricts the number and/or size of the entries allowed to be included in the database. In such cases, if adding an additional entry to the database would cause the database to exceed the size limit, such an additional entry cannot be added to the database, even if doing so would improve the call routing process implemented using the database.

SUMMARY

The present disclosure provides a number of systems and associated processes for managing a database. One embodiment includes a computer-implemented method for updating a database. The method may include accessing a database. The database may include a set of tables, each table associated with a corresponding call destination. Each table in the set of tables has a size limit and includes one or more entries, each entry specifying one or more call parameters that indicate routing information used to route calls made to the call destination associated with the table. The method may further include analyzing historical call data associated with a call destination of the set of call destinations. The historical call data may include information indicating the nature of the calls that were made to the call destination during a given time period. For example, the information may indicate how many calls were made to the call destination from which region in what manner. The method may further include determining, based on the historical call data associated with the call destination, one or more combinations of call parameters to be included in one of the set of tables associated with the call destination. Each call parameter specifies information that may be used to route calls made to the call destination. The method further may include selecting a subset of the one or more combinations of call parameters that is less than a total number of the one or more combinations of call parameters, based on a size limit of the table associated with the call destination. The number of selected combinations of call parameters may be based on how many call parameters are in each combination. The method may further include inserting, for each combination of call parameters in the selected subset, a corresponding entry into the table associated with the call destination. In some embodiments, the call destination is a toll-free number and/or the database is a toll-free database. Although a call destination is used herein as an example, in some cases, a call origination is used instead.

In one embodiment, the method includes: establishing a network connection to a toll-free database host system using a communications protocol, wherein the toll-free database host system is configured to provide an application programming interface (API) for updating a toll-free number database hosted by the toll-free database host system, the toll-free number database comprising a set of tables associated with a set of corresponding toll-free numbers, wherein each table is associated with a size limit and includes one or more routing entries, wherein each routing entry specifies one or more values to be used for routing calls made to a corresponding toll-free number associated with a table from the set of tables, the table including the routing entry, wherein the toll-free number database comprises a first table associated with a first toll-free number in the set of toll-free numbers; accessing historical call data associated with the first toll-free number and carrier data associated with a plurality of carriers; generating, based at least in part on the historical call data and the carrier data, a set of combinations of one or more values to be used for routing calls made to the first toll-free number; determining whether a size of the generated set of combinations exceeds the size limit of the first table associated with the first toll-free number; in response to determining that the size of the generated set exceeds the size limit of the first table, selecting a subset of combinations from the set of combinations to be merged such that a number of carriers used for routing the calls made to the first toll-free number satisfies a threshold condition, and merging the selected subset of combinations such that the size of the set of combinations including the merged subset reaches or falls below the size limit of the first table associated with the first toll-free number; and using the API for updating the toll-free number database to cause the set of combinations including the merged subset to be included in the first table associated with the first toll-free number such that the set of combinations including the merged subset is used for routing the calls made to the first toll-free number.

In one embodiment, the carrier data includes (i) carrier mapping data mapping a plurality of regions to the plurality of corresponding carriers, and/or (ii) carrier metric data associated with a plurality of carriers, the carrier metric data for a given carrier indicative of a metric associated with routing a call from an origin caller to a destination caller via the given carrier.

In one embodiment, the method further includes: selecting a first subset of combinations and a second subset of combinations to be merged from the set of combinations; merging the first subset without merging the second subset and calculating a corresponding first number of carriers used for routing the calls made to the first toll-free number; merging the second subset without merging the first subset and calculating a corresponding second number of carriers used for routing the calls made to the first toll-free number; and based at least in part on a determination that the first number is greater than the second number, causing the set of combinations including the merged second subset to be included in the first table associated with the first toll-free number.

In one embodiment, the method further includes: selecting a first subset of combinations and a second subset of combinations to be merged from the set of combinations; merging the first subset without merging the second subset and calculating a corresponding first number of carriers used for routing the calls made to the first toll-free number; merging the second subset without merging the first subset and calculating a corresponding second number of carriers used for routing the calls made to the first toll-free number; based at least in part on a determination that the first number is equal to the second number, calculating (i) a first amount of projected resource consumption associated with merging the first subset and not the second subset and (ii) a second amount of projected resource consumption associated with merging the second subset and not the first subset; and based at least in part on a determination that the second amount is greater than the first amount, causing the set of combinations including the merged first subset to be included in the first table associated with the first toll-free number.

In one embodiment, the method further includes: selecting a first combination from the set of combinations; splitting the first combination into a first group of combinations and calculating a corresponding first number of carriers used for routing the calls made to the first toll-free number, wherein the set of combinations including the first group of combinations does not exceed the size limit; splitting the first combination into a second group of combinations different from the first group and calculating a corresponding second number of carriers used for routing the calls made to the first toll-free number, wherein the set of combinations including the second group of combinations does not exceed the size limit; and based at least in part on a determination that the first number is greater than the second number, causing the set of combinations including the second group of combinations to be included in the first table associated with the first toll-free number.

In one embodiment, the call parameters may include one or more of a local access and transport area (LATA), an area code, an area code prefix, a 10 digit number, a day of week, a day of year, a time of day, a carrier (e.g., a telephone company), an announcement (e.g., a message to be sent to the caller), and a redirect phone number (e.g., a number which the call made to the toll-free number is to be routed). In another embodiment, the parameters associated with calls made to the toll-free number (e.g., when and where the calls were made) may be referred to as "call parameters" and the parameters that indicate how the calls should be handled (e.g., carriers to which the calls should be routed, announcements to be sent to the origin callers, redirect numbers to which the calls should be routed, etc.) may be referred to as "routing parameters." The phrase "call parameters" as used herein may encompass both call parameters and routing parameters and may include any parameter corresponding to a column of the table associated with the toll-free number in the toll-free database.

In one embodiment, the historical call data may be analyzed over a specified period of time. The specified period of time may be one or more of a past hour, past 24 hours, a past week, a past month, a past year, since a specified time, or since a registration time of the toll-free number.

In one embodiment, the method may include determining a projected distribution of call volume associated with the toll-free number based on the historical call data associated with the toll-free number. The method may further include determining the one or more combinations of call parameters that satisfy a threshold amount of cost savings for the projected distribution of call volume associated with the toll-free number.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

Introduction

Figure 1:
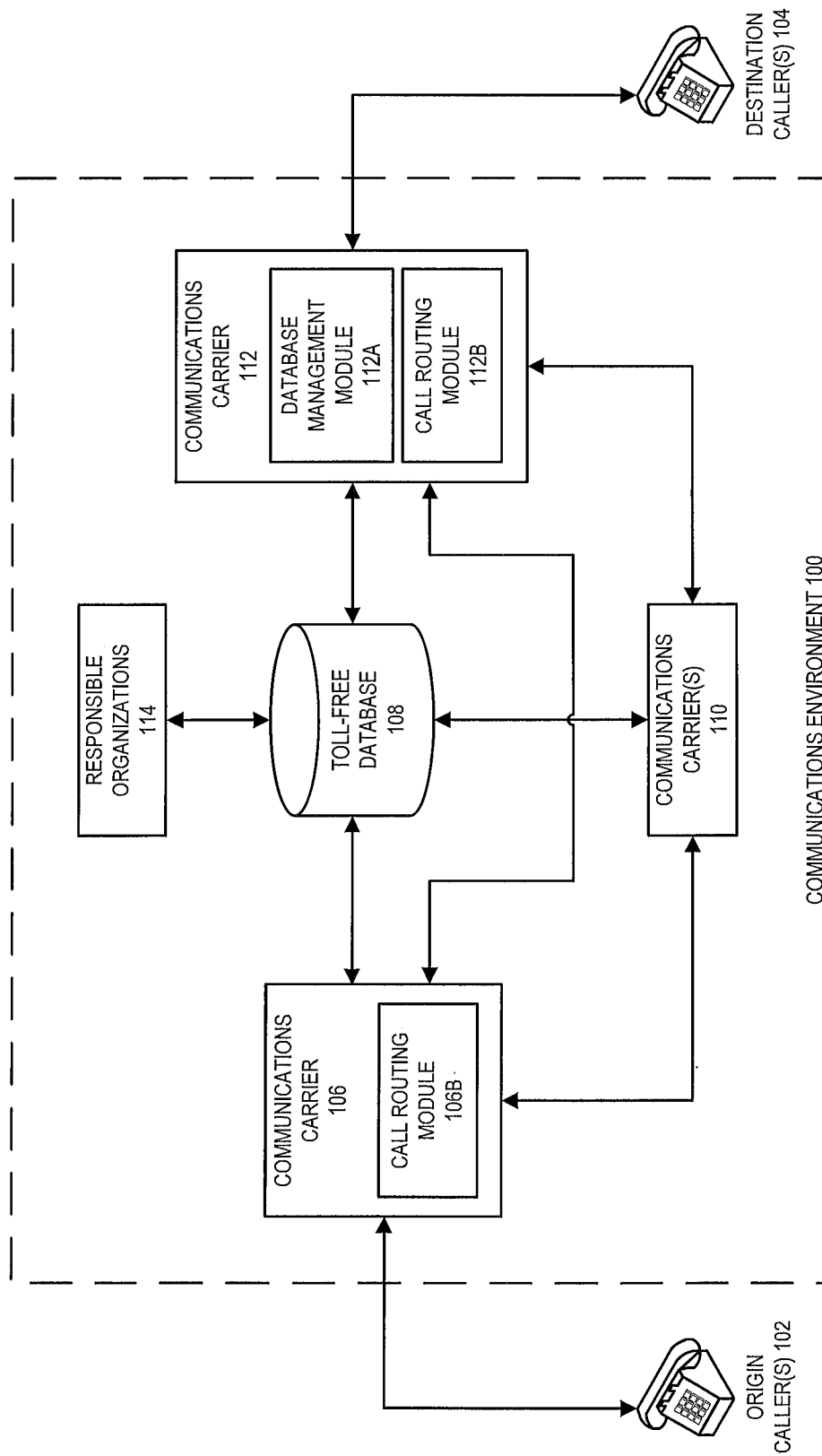
FIG. 1 illustrates an embodiment of a communications environment in accordance with the teachings of the present disclosure.

Toll-free numbers have been very popular since their introduction, and many businesses and organizations today use easy-to-remember toll-free numbers to provide free calls to their offices. Toll-free numbers are assigned on a first-come, first-served basis by entities referred to as "Responsible Organizations" or "RespOrgs." RespOrgs are certified by the SMS/800 administrator, which manages the toll-free service. These entities, which may or may not be communications carrier organizations, have access to a centralized database known as the 800 Service Management System (SMS/800). The database includes information regarding which toll-free numbers have been registered and how calls to the registered toll-free numbers should be routed.

Typically, a user (e.g., who may be an individual, or an employee of an entity) registers a toll-free number with one of the RespOrgs, which may also be a communications carrier organization (e.g., a telephone company) and pays the communications carrier organization a monthly fee and/or for usage charges. For example, Carrier A may offer toll-free numbers at 15 dollars a month and/or charge 10 cents for every minute of toll-free talk time, and Company B may offer toll-free numbers at 20 dollars a month and/or charge 8 cents for every minute of toll-free talk time. The user may choose one of these carriers based on the business needs.

Upon registering a toll-free number, the communications carrier organization may populate (e.g., using a special application programming interface [API] or via an application, or app, or network browser interface) the centralized database (e.g., SMS/800) with entries that specify how the calls to the registered toll-free number should be routed. In some cases, if the communications carrier organization provides wholesale services or aggregation of call traffic, the communications carrier organization may register the toll-free number (e.g., indicate where calls to the toll-free number should be delivered) with one or more additional communications carrier organizations (e.g., telephone companies) so that upon receiving a call, the additional communications carrier organizations can determine where to deliver the calls.

Technical Problems

However, as described above, businesses and organizations that sign up for toll-free numbers are typically locked into a toll-free plan offered by a single communications carrier organization and are unable to choose between multiple carriers to optimize or improve call signal quality, reduce dropped calls or downtime, and/or achieve other benefits such as cost savings. For example, such a communications carrier organization may cause all calls made to its toll-free number to be routed to a destination number via Carrier X, regardless of whether the call originated from a caller using Carrier X or another carrier. Such an approach is problematic because if Carrier X goes down, the calls made to the toll-free number can no longer be routed unless Carrier X is back in service. Further, in the event that the origin caller making the call to the toll-free number is using a carrier other than Carrier X, requesting Carrier X to route the call may result in a reduction in call signal quality or increased latency.

Thus, an improved method of configuring and managing the toll-free database that can address these and other technical problems is desired.

Technical Advantages

This disclosure describes a number of systems and associated processes that address one or more of the problems discussed above. For example, a system according to an embodiment to the present disclosure may allow a communications carrier organization to improve the signal quality of calls made to a toll-free number, reduce the number of dropped calls, and/or reduce downtime or any other issues that arise in routing toll-free calls.

As another example, a system according to an embodiment may generate a toll-free database table for a given toll-free number that satisfies any constraints associated with the toll-free database (e.g., size limit, number of entries, number of columns, etc.) and is optimized or customized based on the call data associated with the given toll-free number. In some cases, such a system may identify ways to improve the call routing process without exceeding the size limit of the toll-free database (e.g., improve call signal quality, reduce dropped calls, reduce downtime, to name a few improvements).

As yet another example, a system according to an embodiment may split a single database entry in the toll-free database into multiple database entries to further granulize the call routing process. For example, the toll-free database may include a single database entry that specifies that all calls originating from California should be routed to a destination number via Carrier X. In such an example, all callers in California but outside of Orange County may use Carrier X to make calls, but the callers in Orange County, Calif. may use Carrier Y to make calls. A call made by a caller outside of Orange County (using Carrier X) can be routed to the destination number without leaving Carrier X's network (e.g., Carrier X routes the call from start to finish), but a call made by a caller in Orange County (using Carrier Y) would leave Carrier Y's network and be routed to the destination number by Carrier X. Such a handoff from Carrier Y to Carrier X may cause the call signal quality to be reduced or increase the chance of the call being dropped. By splitting the single database entry into two database entries (e.g., one specifying that calls from California outside of Orange County should be routed via Carrier X, another specifying that calls from Orange County, Calif. should be routed via Carrier Y), improved call signal quality or other call routing benefits are achieved.

In other cases, such a system may combine multiple database entries in the toll-free database into a single database entry such that space for additional database entries is created. For example, the size limit of the database (or the database table associated with each toll-free number) may limit the number of database entries that can be included in a given table. Such a system may determine whether to split a database entry or combine multiple database entries based on numerous factors such as the number and type of carriers available to route a given call to the destination, the amount of resources needed to route the given call to the destination, and/or the expected latency, downtime, or termination associated with each carrier for routing the given call to the destination, to name a few examples.

As yet another example, a system according to an embodiment may determine how to route calls based on a delta or margin between a criteria associated with the communications carrier customers and the criteria associated with the communications carrier vendors. This criteria may relate to bandwidth, supported lines, costs, or any other routing-related criteria. A communication carrier customer is a communications carrier organization (e.g., Carrier A) requesting that a call be routed by another communications carrier organization (e.g., Carrier B). A communications carrier vendor is a communications carrier organization (e.g., Carrier B) that could potentially route the call for the communications carrier customer (e.g., Carrier A). It is often the case that a communications carrier customer for one call (e.g., Carrier A requests that Carrier B route a call to a destination) can be a communications carrier vendor for another call (e.g., Carrier B requests that Carrier A route another call to another destination), and vice versa. The margin is calculated, for example, by using prices associated with a customer or vendor for a particular call region, or Local Access and Transport Area (LATA). The process of selecting the call routing path based on cost may be referred to as least-cost routing (LCR).

For example, the communications carrier organization (e.g., Carrier A) registering the toll-free number "1-800-MYMOVER" for a moving company may determine that it would be cheaper for Carrier B to handle calls originating from California but it would be cheaper to use Carrier C for calls originating from New York. Consequently, Carrier A may configure the database such that if a call to 1-800-MYMOVER is made from California, the call would be routed to 213-000-9876 via Carrier B, and if a call to 1-800-MYMOVER is made from New York, the call would be routed to 212-000-1234 via Carrier C.

In certain embodiments, these systems and processes can be implemented in the context of a toll-free number database system, in which the systems and processes may analyze historical call data associated with a toll-free number and select and/or filter toll-free database entries that specify how calls to the toll-free number should be routed in a way that the database size limit associated with the toll-free number is not exceeded. Advantageously, in some embodiments, the selecting, filtering, splitting, and/or consolidating of the database entries are adapted to improve the call signal quality of the calls made to the toll-free number, reduce downtime or dropped calls, reduce the costs associated with routing the calls, to name a few examples. These and other features are described in greater detail below with respect to the Figures.

Example Communications Environment

FIG. 1 illustrates an embodiment of a communications environment 100 in accordance with the teachings of the present disclosure. As illustrated in FIG. 1, the communications environment 100 includes origin caller(s) 102, destination caller(s) 104, communications carrier systems 106, 110, and 112, a toll-free database 108, and responsible organizations 114. In the communications environment 100, the origin caller 102 can make a call to a toll-free number that is owned by the destination caller 104. The call is not limited in type. For example, the call can be: a telephone call placed via mobile phone, landline phone, or a combination; a facsimile call; a Voice over Internet Protocol (VoIP) call; or a modem call; to name a few. Further, the origin caller 102 and the destination caller 104 can include any user or organization capable of placing the call.

To establish the call connection between the origin caller 102 and the destination caller 104, the call is routed among a number of communications carrier systems associated with a number of communications carrier organizations. Each communications carrier organization may be associated with one or more communications carrier systems and generally, although not necessarily, each communications carrier system is associated with a single communications carrier organization.

In the example of FIG. 1, the communications carrier system 112 is illustrated as having a database management module 112A and a call routing module 112B. The communications carrier system 106 has a call routing module 106B. The database management module 112A of the communications carrier system 112 may configure and manage the toll-free database 108 according to one or more rules specified by the communications carrier organization to which the toll-free number is registered, or an entity in charge of managing the toll-free number. The process of configuring and managing the toll-free database 108 is described below in greater detail with reference to FIG. 4.

The call routing module 106B of the communications carrier system 106 may detect calls made by the origin caller 102 and route the calls based on one or more call parameters associated with the calls. For example, the call routing module 106B may detect that a call is made from the origin caller 102. In one embodiment, the communications carrier system 106 represents the local communications carrier organization that the origin caller 102 uses to make local or long-distance calls. When the call routing module 106B determines that the call is made to a toll-free number, the communications carrier system 106 may access the toll-free database 108 (e.g., SMS/800) to determine how the call should be routed.

The call routing module 106B may determine, based on call parameters associated with the call originating from the origin caller 102, how the communications carrier system 106 should proceed with the call. The process of routing a toll-free call is described below in greater with reference to FIG. 5.

On the other hand, if the call routing module 106B determines that the call is not made to a toll-free number, the call routing module 106B may route the call in a manner similar to those described in U.S. application Ser. No. 13/367,133, filed on Feb. 6, 2012, titled "SYSTEM AND METHOD FOR DYNAMIC MULTIFACTOR ROUTING," which is hereby incorporated by reference in its entirety. For example, the call routing module 106B may route the call according to a least-cost routing (LCR) process based on cost. In one embodiment, the communications carrier system 106 may be configured to handle calls to both toll-free numbers and non-toll-free numbers. For example, the communications carrier system 106 described herein may be integrated into a routing switch for handling calls to non-toll-free numbers. In another embodiment, the communications carrier system 106 may be separate from a communications carrier system configured to handle calls to non-toll-free numbers.

In one embodiment, the communications carrier system 106 may determine, based on the call routing information stored in the toll-free database 108, that the call is to be routed to a destination number (e.g., a number associated with the destination caller 104) via one or more communications carriers 110. In another embodiment, the communications carrier system 106 may determine, based at least in part on the call routing information stored in the toll-free database 108, that the call should be routed directly to the destination number via the communications carrier system 112, which may represent the local communications carrier organization used by the destination caller 104. In such an embodiment, the call may not go through the communications carrier(s) 110. In yet another embodiment, although it is not illustrated in FIG. 1, the communications carrier system 106 may determine, based on the call routing information stored in the toll-free database 108, that the call should be handled by the communications carrier system 106 and route the call to the destination number (e.g., to the destination caller 104).

Upon receiving the call, the call routing module 112B of the communications carrier system 112 may determine the call destination (or call origination) of the toll-free number. For example, the call routing module 112B may query its internal database to determine the destination associated with the toll-free number. After determining that the call should be routed to the destination caller 104, the call routing module 112B delivers the call to the destination caller 104. In the case in which the toll-free number is not found in the internal database of the communications carrier system 112, the call routing module 112B may cause the call to fail or drop the call.

The communications carrier systems 106, 110, and 112 can include any system capable of processing and routing a call. These systems can be associated with any communications carrier organization, such as InterMetro Communications. Each of the communications carrier organizations associated with the communications carrier systems 106, 110, and 112 may be a RespOrg having access to the toll-free database 108. Generally, each communications carrier system is associated with a communications network (not shown) that the communications carrier organization owns or rents. Further, each communications network can include a number of computing devices to facilitate communications within the communications carrier organization's network and between various communications carrier systems. Some non-limiting examples of these computing devices are illustrated in FIG. 1 with respect to the communications carrier system 106 (e.g., database management module 112A and call routing module 106B) and are described further below. Although the communications carrier systems 106, 110, and 112 are depicted similarly, in some embodiments, the communications carrier systems 106, 110, and 112 can have varying configurations. For example, one or more of the communications carrier systems 110 and 112 may just have the call routing module similar to the call routing module 106B. In some embodiments, one or more of the responsible organizations 114 may have database management modules similar to the database management module 106A.

The responsible organizations 114 represent other organizations that are certified by the SMS/800 administrator and have access to the toll-free database 108 but do not necessarily provide communications services. Such RespOrgs 114 may provide independent toll-free database management services for one or more owners of toll-free numbers. The term "owner," in addition to its ordinary meaning, may be used herein to refer to an individual to whom the toll-free number is registered, a representative of a business or organization to which the toll-free number is registered, or an entity in charge of managing the toll-free number such as the communications carrier system 112 or the communications carrier organization associated therewith.

The toll-free database 108 may store registration and call routing information for each toll-free number in the relevant country (e.g., USA) or in the relevant region (e.g., North America, or a sub-region within a country). For example, the toll-free database 108 may have a set of tables, and each table within the toll-free database 108 may be associated with a single registered toll-free number.

The toll-free database 108 may be shared among some or all of the communications carrier organizations. In some such cases, because the database 108 is shared among entities, modifications to the database may be restricted, at least in part. For example, although a carrier may modify routing parameters for a toll-free number managed by the carrier, the carrier may be prevented from modifying the structure of the database 108. Further, in some cases, the toll-free database 108 may be configured according to one or more rules specified by a governing body (e.g., the administrator of the toll-free database 108). In some cases, the toll-free database 108 may be managed by a governmental entity, a company hired by the governmental entity, or a private entity.

In some embodiments, the database (or the administrator managing the toll-free database 108) may specify a size limit for each table within the toll-free database 108. In one embodiment, the size limit may be 180 KB. The size limit may limit the number of rows and columns that may be inserted into the tables. For example, the size of the table may be determined based on the number of rows and the number of columns included in the table. Each additional column may occupy more space than each addition row, and vice versa. The size of the table may be calculated based on the amount of data (e.g., text) stored in the table. The administrator of the toll-free database 108 may provide a formula for calculating the size of the table. For example, the formula may be designed such that the size of the table is proportional to the number of rows in the table, the number of columns in the table, and/or the number of single entries (e.g., the number of unique area code prefixes in the table). Example tables associated with toll-free numbers are illustrated in FIGS. 2 and 3.

Although various techniques of the present disclosure are described in the context of toll-free call routing, the embodiments of the present disclosure are not limited as such, and the techniques described herein may be extended to management of databases other than the toll-free database 108, such as, for example, a database for routing non-toll-free calls, a database for routing network requests, or any other database having a size limit.

Example Toll-Free Tables Stored in Toll-Free Database

Figure 2:
FIG. 2 illustrates an example table storing routing information for a toll-free number, in accordance with the teachings of the present disclosure.
Figure 3:
FIG. 3 illustrates another example table storing routing information for a toll-free number, in accordance with the teachings of the present disclosure.

FIG. 2 illustrates a table 200 associated with the toll-free number "1-800-AAAAAAA." As illustrated in FIG. 2, the table 200 includes columns "LATA," "AREA," "TIME OF DAY," "DAY OF WEEK," "CARRIER," and "DESTINATION." The column LATA may include the area from which the toll-free call is made. For example, the map of the serviced area (e.g., USA, North America, etc.) may be divided into a plurality of local access and transport areas (e.g., into 250 LATAs that cover the entire country) and assigned a corresponding number (e.g., LATA 730 represents the Los Angeles area). The column AREA may include the area code of the number associated with the origin caller 102. The column TIME OF DAY may include whether the call was made during the day, at night, or during a specific time period (e.g., 8:00 AM-11:00 AM). The column DAY OF WEEK may include on which of the seven days (SMTWTFS) the call was made. The column CARRIER may include the communications carrier organization that is supposed to handle the call originating from the region/time specified by other call parameters. The column DESTINATION may include the destination number to which the call should be routed. In addition, although not shown in FIG. 2, the table 200 may also include a column for specifying the area code and the prefix (e.g., the first three digits after the area code) of the origin caller 102, a column for specifying the 10-digit number of the origin caller 102, a column for specifying the date on which the call was made, a column for specifying an announcement to be forwarded to the origin caller 102, and/or any other column specifying information that may be used for routing the toll-free call.

Each column of the table 200 may be referred to as a call parameter. Under the row specifying the call parameters, there are 5 rows, each of which may be referred to as an entry. It should be noted that each entry may specify some or all of the call parameters stored in the table. For example, the first entry specifies that calls originating from LATA 730 (e.g., Los Angeles area) and having the area code 310 made during the day should be routed to phone number 310-001-2345 via TELCO A, and the second entry specifies that similar calls made at night should be routed to phone number 310-001-2345 via TELCO C.

FIG. 3 illustrates a table associated with the toll-free number "1-800-BBBBBBB." As illustrated in FIG. 3, the table 300 includes columns "LATA," "AREA," "TIME OF DAY," "DAY OF WEEK," "CARRIER," "ANNOUNCEMENT," and "DESTINATION." The table 300 has one more column ("ANNOUNCEMENT") than the table 200. Having the extra column may cause the table 300 to have room for only 4 entries in the table. As a result, the table 300 does not differentiate between calls made from a non-310 area code in LATA 730 on a weekday and calls made from a non-310 area code in LATA 730 during the weekend. In one example, the size of the table 200 may be calculated by multiplying the number of columns and the number of rows, which is 6×6=36. Similarly, the size of the table 300 may be 7×5=35. If the size limit on the tables is 40, neither of the tables 200 and 300 can have additional entries added thereto, since doing so would exceed the size limit.

Size Limit on Toll-Free Database

One problem with the centralized toll-free database (e.g., toll-free database 108) is that it may limit the size of the records that may be entered into the database for a given toll-free number. Although the toll-free database may not limit the number of toll-free numbers stored in the toll-free database, it may limit the tables (or sub-databases) that are associated with the toll-free numbers stored in the toll-free database. Each table may have a size limit associated therewith, and the size limit may limit the number of entries that may be included in the tables associated with the toll-free numbers. For example, the size limit may be set such that it is not possible to include all combinations of call parameters for a given toll-free number in the toll-free database.

Since different communications carrier organizations may offer different rates, charges, and fees for different regions from which the toll-free call is made and/or different times at which the toll-free call is made, using a single carrier for all the regions and/or times may not be cost effective. For example, Carrier A may offer better rates for toll-free calls originating from California and Carrier B may offer better rates for toll-free calls originating from New York. In another example, Carrier C may offer better rates for toll-free calls made on weekdays and Carrier D may offer better rates for toll-free calls made on the weekend. Further, the most cost-effective solution may differ for each area codes, each area code prefixes, and even at the 10-digit number level. For example, in some cases, a call from phone number 213-500-5001 may be routed to a different carrier than a call from phone number 213-500-5002. Whether the calls are routed to different carriers may be based on whether the number from which the calls are made are associated with different carriers or different local routing numbers (LRNs). For example, even though Carrier A may offer, on average, the least expensive rates for LATA 730, for a sub-region within LATA 730 (e.g., area code 310), Carrier B may actually be the least expensive carrier to use. Thus, a generic LCR table built by picking the least expensive carrier for each LATA may not be cost-effective (e.g., lose money for the communications carrier organization handling the toll-free number, or the individual or enterprise owner to whom the toll-free number is registered, if cost savings may be passed onto such an owner) if a disproportionately large amount of calls to the given toll-free number originated from area code 310.

In one embodiment, the communications carrier system 112 may configure the table associated with the toll-free number by using the rate deck (which may specify how much the communications carrier organization charges for different regions and/or different times) for each communications carrier organizations available for call routing. For example, the communications carrier system 112 may, for each sub-region in the relevant country (e.g., USA) or region (e.g., North America), determine the carrier that offers the lowest per-minute cost and generate an LCR table based on the rate decks. For example, such an LCR table may specify, for each LATA, area code, area code+prefix, 10-digit number, and/or time of the call, a communications carrier organization that offers the lowest per-minute cost. However, due to the size limit placed on the tables in the toll-free database, it may not be possible to enter all the information in the generated LCR table into the table associated with the toll-free number in the toll-free database. In other words, there may be hundreds of millions of entries in the generated LCR table representing each of the different combinations of call parameters (e.g., LATA, area code, area code+prefix, 10-digit number, time of day, day of week, day of year, carrier, announcement, destination number, etc.). If the toll-free database limits the number of rows to be added to the tables to 20,000 rows, it would be impossible to specify the optimal carrier in the table for each combination of call parameters. Consequently, the combinations of call parameters that cannot be included in the table associated with the toll-free number may not be optimized or otherwise managed, so the communications carrier organization handling the toll-free number may be losing money for such combinations. If the entity paying for the use of the toll-free number is charged a variable rate based on the costs incurred to the communications carrier organization for each call to the toll-free number, the entity may also be losing money as a result of not being able to choose the optimal carrier for each combination of call parameters.

In some embodiments, the communications carrier system 112 may determine, based at least in part on the LATA, area code, area code+prefix, and/or 10-digit number of the origin caller, the carrier used by the origin caller. For example, the communications carrier system 112 may access a database including mapping information indicative of which LATA, area code, area code+prefix, and/or 10-digit number belongs to which carrier. Based on the carrier used by the origin caller, the communications carrier system 112 may determine to which carrier the call should be routed to achieve the highest call signal quality.

In some cases, the communications carrier system 112 minimizes the number of handoffs between carriers. For example, upon determining that the origin caller uses Carrier A, the communications carrier system 112 determines whether there is a destination number associated with Carrier A. Upon determining that there is a destination number associated with Carrier A, the communications carrier system 112 causes the call to be routed, via Carrier A, to the destination number associated with Carrier A. Upon determining that there is no destination number associated with Carrier A, the communications carrier system 112 may cause the call to be routed via another carrier that can deliver the call to the destination number.

Such a carrier may be selected based at least in part on a score calculated for each carrier available to route the call. For example, the score may be calculated based on the rate offered by each carrier for routing the call made by the origin caller to a destination number. If the toll-free number is associated with multiple destination numbers, a score may be generated for each of the destination numbers. The carrier and destination number combination that yields the best performance (e.g., based on expected call signal quality, number of handoffs, expected error rate, network resource consumption, cost savings, to name a few) may be selected by the communications carrier system 112 to be placed in the toll-free database.

Time Limit on Changes to Toll-Free Database

In some embodiments, the communications carrier organizations or other RespOrgs may have a limit on the number of changes that can be made to the toll-free database. In one embodiment, the RespOrgs may be limited to one change to the toll-free database every 15 minutes. For example, after making a change to the table associated with a toll-free number, the RespOrg may need to wait until the clock resets on the zero, 15, 30, and 45 minute mark of the hour. For example, if a change is made at 3:01 PM, the next time a change may be made to the same table is at 3:15 PM, meaning that the RespOrg has to wait at least for 14 minutes. If a change is made at 3:14 PM, the RespOrg may only have to wait for 1 more minute before making another change to the same table. The changes to the toll-free database may be presented to the RespOrg in a file (e.g., Excel file, text file, etc.), and the RespOrg may use the file as a template for updating the toll-free database. Alternatively, or in addition, the changes may be sent directly to the toll-free database via a software program provided by the RespOrg.

Example Toll-Free Database Management Process

Figure 4:
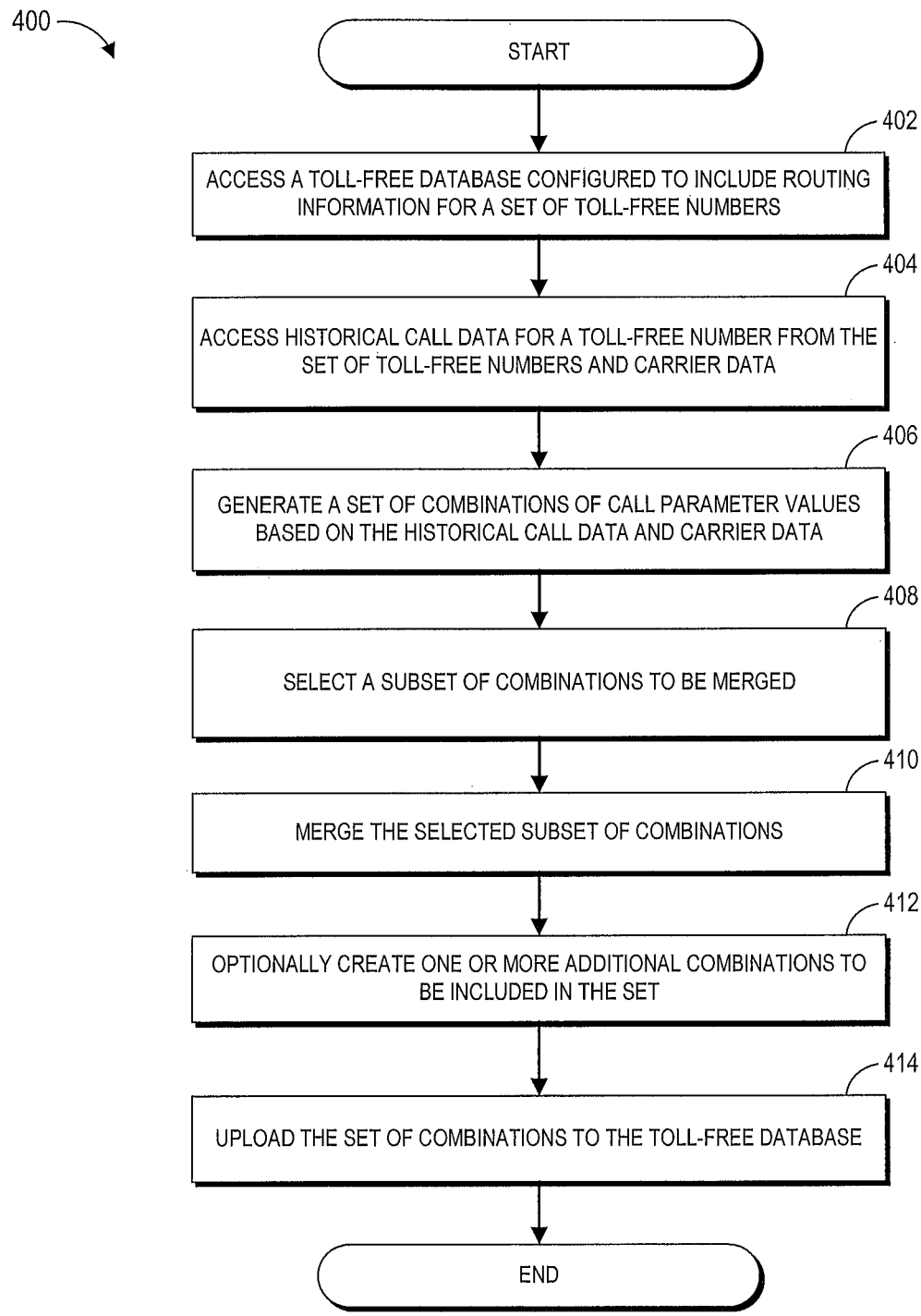
FIG. 4 illustrates a flow diagram for one embodiment of a toll-free database management process in accordance with the teachings of the present disclosure.

FIG. 4 illustrates a flow diagram for one embodiment of a process 400 for configuring and managing a toll-free database in accordance with some teachings of the present disclosure. The process 400 can be performed by any system configured to access the toll-free database. For example, the process 400 can be performed, at least in part, by a communications carrier system 106 that initially received a call from the origin caller 102, a communications carrier system 112 that completed the final call connection to the destination caller 104, or a communications carrier system somewhere in between. In one embodiment, a database management module (e.g., database management module 112A)

associated with the communications carrier system can perform the process 400. To simplify discussion, the process 400 will be described as performed by the communications carrier system 106. For example, using the process 400, the communications carrier system 112 may use historical patterns and develop the most cost effective partitioning of each area to fit inside the size limitations of the toll-free database 108.

The process 400 begins at block 402 when, for example, the communications carrier system 112 may access a toll-free table database configured to include routing information for a set of toll-free numbers. For example, the communications carrier system 112 may establish a network connection to a toll-free database host system using a communications protocol such as the Internet Protocol (IP). The toll-free database host system is an entity that hosts the toll-free database 108 and handles requests to access or update the toll-free database 108 received from communications carrier organizations or other RespOrgs. The toll-free database host system may provide a plurality of APIs for accessing and updating the toll-free database 108, and the communications carrier system 112 may access or update the toll-free database 108 using the APIs (e.g., by making calls to the APIs).

The communications carrier system 112 may access the toll-free database 108 at the request of the communications carrier organization associated with the communications carrier system 106. Additionally or alternatively, the communications carrier system 112 may access the toll-free database 108 according to a schedule (e.g., as a periodic management and update performed for the toll-free number). In one embodiment, the communications carrier system 112 may access the toll-free database for the purpose of updating the toll-free database after each predetermined time period (e.g., a day, a week, a month, a year). In another embodiment, the communications carrier system 112 may access the toll-free database for the purpose of updating the toll-free database after a threshold number of calls have been made to the toll-free number. In some embodiments, the communications carrier system 112 may access a table that is part of the toll-free database and is associated with the toll-free number. As discussed in connection with FIG. 1, the toll-free database may store registration and call routing information for each toll-free number in the relevant country (e.g., USA) or in the relevant region (e.g., North America, or a sub-region within a country). For example, the toll-free database may have a set of tables, and each table may be associated with a single registered toll-free number.

At block 404, the communications carrier system 112 accesses the historical call data for one of the toll-free numbers in the set of toll-free numbers and other data usable to generate an optimized or improved toll-free table for the toll-free number. Such other data may include (i) carrier mapping information indicative of which LATA, area code, area code prefix, or 10-digit phone number is associated with which carrier, (ii) the current cost data associated with the toll-free number, and/or (iii) destination number data indicative of one or more local destination numbers to which the call made to the toll-free number may be routed, to name a few examples. In one embodiment, the communications carrier system 112 may retrieve some or all of these data from an internal database. In another embodiment, the communications carrier system 112 may receive the some or all of these data from the communications carrier organization that manages the toll-free number or a user (or representative of an entity) who pays (or otherwise reserves access) for the use of the toll-free number. In yet another embodiment, the communications carrier system 112 may receive the some or all of these data from another communications carrier system.

The historical call data may include the number of calls made to the toll-free number, the length of each call made to the toll-free number, or any other call parameter (e.g., LATA, area code, area code+prefix, 10-digit number, time of day, day of week, day of year, etc.) associated with the calls. In one embodiment, the current cost data associated with the toll-free number may include a rate deck associated with each communications carrier organization. The rate decks may indicate the costs associated with routing the calls through the respective communications carrier organizations' networks. Other numbers such as time of day, percentage, capacity, quality, etc. may also be added to the rate decks. For example, the rate deck may specify how much the communications carrier organization charges for different regions and/or different times. The rate deck may be specific to the toll-free number, where the charges vary depending on the local number associated with the toll-free number. The rate decks may be provided by the communications carrier organizations. In one embodiment, the rate deck associated with each communications carrier organization may be updated periodically or upon receipt of new rates. The current cost data may include the most recently updated version of the rate decks associated with the communications carrier organizations. In another example, the current cost data may include the most recent copies of the rate decks associated with the communications carrier organizations that are available to the communications carrier system 106. The destination number data may include at least two destination numbers each associated with a different carrier. For example, the destination number data may indicate that the toll-free number may be routed to a first number handled by a first carrier and to a second number handled by a second carrier. In some embodiments, the communications carrier system 112 updates the toll-free database such that calls from origin callers associated with such first carrier to be routed to the destination number handled by the first carrier, and such that calls from original callers associated with such second carrier to be routed to the destination number handled by the second carrier. By doing so, the communications carrier system 112 can minimize or reduce the number of handoffs needed to deliver the calls and optimize or improve the call signal quality and/or reduce the error rate associated with the toll-free number.

At block 406, the communications carrier system 112 generates a set of combinations of one or more values, based on the received historical call data. For example, the generated set of combinations may include every region in the country (or every portion of the region associated with the toll-free number). In such an example, a toll-free table including all of the generated set of combinations may exceed the size limit on the toll-free table. In another example, the generated set of combinations may include only those regions from which at least one call was made to the toll-free number based on the historical call data. In such an example, a toll-free table including all of the generated set of combinations may exceed the size limit on the toll-free table.

Alternatively, or in addition, the communications carrier system 112 may generate a list of regions ordered based on a number of calls made to the toll-free number from each region. In another example, the generated set of combinations may be a list of time periods ordered based on a number of calls made to the toll-free number at each time period. In yet another example, the generated set of combinations may be a list of combinations of regions and time periods ordered based on a number of calls made to the toll-free number at each combination of regions and time periods.

The one or more values may include call parameter values and/or routing parameter values. As discussed above, the phrase "call parameters" may include any information associated with a call to the toll-free number that may be used for routing the call (e.g., LATA, area code, time of day, etc.), and the phrase "call parameter values" may include specific values of such call parameters (e.g., 730 for LATA, 310 for area code, daytime for time of day, etc.). Similarly, the phrase "routing parameters" may include any information that facilitates the communications carrier system 106 to determine how to process calls to the toll-free number (e.g., determine carriers to which the calls should be routed, announcements to be sent to the origin callers, redirect numbers to which the calls should be routed, etc.), and the phrase "routing parameter values" may include specific values of such routing parameters (e.g., "Telco A" for the carrier, "This number is currently not in service" for the announcement, and "1-213-500-5050" for the redirect number, etc.).

The communications carrier system 112 may analyze the received historical call data to identify a spatial and/or temporal trend in the calls made to the toll-free number. For example, by determining when and where the calls to the toll-free number are being made, the communications carrier system 112 may determine which regions and/or time periods may have the biggest impact in optimizing or improving the call signal quality, resource consumption, error rate, cost savings, etc. Based on the determinations, the communications carrier system 112 may be able to achieve an optimal use of the limited space in the toll-free database by optimizing the calls originating from those regions and/or time periods that have the biggest impact first. In one embodiment, the communications carrier system 112 uses a regression algorithm to generate a set of combinations of call parameter values, ordered such that the combinations that result in the biggest cost savings are at the top. For example, the regression algorithm may use the mathematical formula provided by the administrator of the toll-free database to determine improved or optimized combinations of call parameter values without exceeding the specified size limit. For example, the regression algorithm may compare the carriers for the highest level of traffic area and generate an entry for that area. The regression algorithm may then find the second highest level of traffic area, compare the carriers for that area and generate an entry, and similarly process each remaining area. In one embodiment, the regression algorithm continues to generate entries for the remaining areas until a threshold number of areas have been processed. The regression algorithm may select carriers to minimize (or reduce) the total number of carriers used in routing calls to the toll-free number, minimize (or reduce) the consumption of resources in routing calls to the toll-free number, maximize (or improve) the amount of cost savings, to name a few examples.

In one embodiment, the optimization process performed by the regression algorithm may differ based on the size limit associated with the toll-free number. For example, the regression algorithm may determine, based at least in part on the number of regions that calls to the toll-free numbers originate, that there is enough room in the table associated with the toll-free number to specify all the combinations of call parameter values for the toll-free number. In some such cases, the regression algorithm may generate the set of combinations of call parameter values to optimize or improve the call routing process and to improve the call signal quality, reduce error rates, and/or maximize or improve cost savings. In another example, the regression algorithm may determine that there is not enough room to specify all the combinations of call parameter values for the toll-free number. In some such cases, the regression algorithm may generate the set of combinations of call parameter values by combining or merging some of the combinations such that the number of combinations in the generated set is closer to or within the size limit associated with the toll-free number. In one embodiment, the communications carrier system 112 adds new combinations of call parameter values until just before the size limit is exceeded.

In one embodiment, the communications carrier system 112 may generate a report for the owner of the toll-free number indicating how the owner would have saved had the table associated with the toll-free number been optimized earlier (e.g., last week, last month, last year, etc.) using the regression algorithm. For example, the software program running on the destination caller's system (e.g., destination caller 104, communications carrier system 112, or any other entity that has access to all the call volume data) may allow the destination caller 104 to view a report on his or her toll-free number. When the toll-free number is first obtained, the software program may generate a generic LCR since the toll-free number may not yet have received any traffic. The destination caller 104 would then upload the LCR to the toll-free database 108. After a month or so, the destination caller 104 may run a report on the toll-free number and see how the generic LCR has been performing. For example, the report may indicate how much the destination caller 104 may have saved during the past month if the destination caller 104 had configured the toll-free database 108 in a different way (e.g., in an optimal way based on the call volume data of the past month). If the destination caller 104 wishes to update the configuration of the toll-free number in the toll-free database 108, the destination caller 104 may cause the software program to automatically update the toll-free database 108 such that the most current/optimum combination of call parameters for the toll-free number are included in the toll-free database 108.

The regression algorithm may also take into account additional restrictions or constraints that may be specified by the administrator of the toll-free database. For example, one constraint may require that a number of regions in a country always be covered by a particular carrier. In some embodiments, the regression algorithm may skip certain areas based on restrictions or limitations (e.g., placed by the owner of the toll-free number). For example, a restriction may specify that calls originating from a certain region should be routed to a specific carrier. In another example, if the communications carrier system 112 knows that no calls will be coming from a certain region, the communications carrier system 112 may skip the region in its analysis. In another embodiment, the communications carrier system 112 generates a full set of combinations and filters and/or selects one or more combinations from the full set such that the filtered and/or selected combinations have a total size that does not exceed the size limit.

In some cases, the communications carrier system 112 may determine a projected distribution of call volume associated with the toll-free number based on the historical call data associated with the toll-free number, and determine one or more combinations of call parameters that satisfy a threshold amount of cost savings for the projected distribution of call volume associated with the toll-free number. For example, if the historical call data indicates that 1,000 calls were made from Area A and 10 calls were made from Area B, and the rate decks from Carriers A and B specified that they would charge 10 cents and 5 cents for Area A, respectively, and 20 cents and 30 cents for Area B, respectively, and the size limit on the table allowed only a single entry to be entered into the table associated with the toll-free number, the communications carrier system 112 may enter one entry specifying that all calls should go to Carrier B, because the historical call data suggests that a greater amount of cost savings may be achieved by choosing Carrier B (1,000×5+ 10×30=$5.30) over Carrier A (1,000×10+10×20=$10.20).

Further, the communications carrier system 112 may consider the length of the calls. For example, if the 1,000 calls from Area A were each a minute long and the 10 calls from Area B were each two hours, the total talk time originating from Area B would be greater (e.g., 1,200 minutes) than the total talk time originating from Area A (e.g., 1,000 minutes). The communications carrier system 112 may determine, based on the total talk time originating from each region, that the table in the toll-free database 108 should specify that all calls should be routed to Carrier A (1,000×10+1,200×20=$340.00) instead of Carrier B (1,000× 5+1,200×30=$410.00).

In one embodiment, even if no call was received from a certain region, the communications carrier system 112 may optimize the region if there is room left in the table. The optimization may occur based on the regions from which calls were actually received. For example, if area 310 generates a lot of traffic and if there is room left in the table, the communications carrier system 112 may further granulize nearby areas (e.g., area codes 424 and 805) just to make sure the routing of calls received from such areas would be optimized and thus enjoy similar improvements (e.g., improved call signal quality, reduced errors, reduced cost, etc.) should a call occur in those areas even though it did not during the relevant time period (e.g., the past week).

For example, the communications carrier system 112 may analyze the call data for the past hour, the past 24 hours, the past week, the past month, or the past year. In another example, the communications carrier system 112 may analyze the cumulative call data collected since a specified time or since the registration time of the toll-free number.

At block 408, the communications carrier system 112 selects a subset of combinations based on the set of combinations generated at block 406. In one embodiment, the communications carrier system 112, based on the size limit associated with the toll-free number (e.g., for the table in the toll-free database), reduces the set of combinations generated at block 406 down to a smaller set containing fewer combinations. For example, if the communications carrier system 112 determines that the table associated with the toll-free number has enough room for 2,000 entries, the communications' carrier system 112 may select the subset of combinations such that the selected subset contains 2,000 combinations. In some embodiments, the communications carrier system 112 may determine whether the set of combinations generated at block 406 has a size that exceeds the size limit on the toll-free table, and in response to determining that the set of combinations has a size that exceeds the size limit, select the subset of combinations at block 408.

In one embodiment, the set of combinations generated at block 406 may be ordered by the magnitude of projected cost savings that would result from specifying each combination in the table associated with the toll-free number. In such an embodiment, the communications carrier system 112 may select the subset of combinations by truncating the set of combinations to satisfy the table size limit on the number of combinations (e.g., top 2,000 combinations in the ordered list). The projected cost savings may be determined based on projecting or estimating the likely number of received calls, based at least in part on the historical call data, and the current rate table for the different communication carriers. For example, if the historical call data indicates that, during the last month, 200 calls were received from Region A, 500 calls were received from Region B, and 300 calls were received from Region C, the ordered list of combinations generated based on these numbers and the current cost data associated with the toll-free number at block 406 may list Region B, Region C, and Region A in that order (along with the respective optimal carrier(s)). If the communications carrier system 112 determines that only two entries can be included in the table associated with the toll-free number, the communications carrier system 112 may select the first item in the generated list, which is Region B and its least expensive carrier, and combine the other items (e.g., corresponding to Regions C and A) into a single item to have a total of two items. In some cases, the order of the regions (or other call parameter values) may not correspond to the relative call volume. For example, if the calls originating from Region A are longer and/or more expensive according to the current cost data, it may have a higher priority than Regions B or C.

In another embodiment, the communications carrier system 112 may reduce the number of combinations in the set of combinations by combining or merging some of the call parameters. For example, if the set of combinations includes (1) [LATA=730, area code=310, Carrier=Telco A], (2) [LATA=730, area code=other, Carrier=Telco B], and (3) [LATA=other, Carrier=Telco C], and the size limit of the table associated with the toll-free number allows two entries to be added, the communications carrier system 112 may combine area codes "310" and "other" so that the combinations (1) and (2) may be combined into [LATA=730, Carrier=B] (e.g., if Carrier B offers better rates for LATA 730 on average). In some embodiments, the communications carrier system 112 groups together one or more regions from which the least amount of call traffic is received based on the historical call data. In some implementations, the communications carrier system 112 may compare multiple options for combining or merging (e.g., merging combinations A and B vs. merging combinations B and C) and select the most desirable option based on the number of carriers needed to route calls, resource consumption, and/or other metrics.

In other cases, the communications carrier system 112 may also split a set of combinations, areas, and/or an entry in the toll-free table. For example, the communications carrier system 112 may determine that within Region X generally associated with Carrier A includes one or more pockets that are handled by Carrier B. In such a case, the communications carrier system 112 may generate one entry that specifies that calls originating from the one or more pockets of Region X should be routed to a destination number via Carrier B, and generate another entry that specifies that calls originating from all other areas of Region X (e.g., from those other than the one or more pockets handled by Carrier B) should be routed to a destination number via Carrier A. In some cases, the communications carrier system 112 may compare multiple options for splitting a combination and select the most desirable option based on the number of carriers needed to route calls, resource consumption, and/or other metrics.

At block 410, the communications carrier system 112 merges the selected subset of combinations. In some cases, the communications carrier system 112 may create an entry for each combination of values in the set of combinations including the merged subset. For example, the communications carrier system 112 may generate a table entry based on each combination of values and add it to the table associated with the toll-free number.

At block 412, the communications carrier system 112 may optionally create one or more additional combinations or additional entries for combinations that are not in the set of combinations including the merged subset. Some of such additional combinations or entries may be associated with the combinations of call parameter values that are not present in the historical call data. In some embodiments, some of such additional combinations or entries may be associated with the combinations of call parameter values that were present in the historical call data but not selected by the communications carrier system 112 at block 408.

At block 414, the set of combinations (or corresponding entries) are uploaded to the toll-free database 108. The table entry may be added to the table associated with the toll-free number or the existing table may be replaced with a new table using a Web graphical user interface (GUI) or modular gateway interface (MGI). In some embodiments, the MGI entity may provide its own API that allows the communications carrier system 112 to communicate with the MGI entity over the Internet or a private link. For example, the communications carrier system 112 may submit data to the MGI entity's proprietary API, and the MGI entity may translate it to MGI language and send the changes to the toll-free database 108. In one embodiment, the communications carrier system 112 may lease or rent time on one of the entities who have an MGI and submit changes through such an entity. After block 414, the process 400 ends. Alternatively, portions of the process 400 may be repeated intermittently.

In the process 400, one or more of the blocks shown in FIG. 4 may be removed (e.g., not performed), modified, the order in which the process is performed may be switched, and/or one or more additional blocks may be added. For example, the communications carrier system 112 may analyze the historical call data at block 404 and determine the combinations of call parameters at block 406 before accessing the toll-free database at block 402. In another example, instead of inserting an entry for each combination of call parameters at block 408, the communications carrier system 112 may modify one or more existing entries to reflect one or more of the combinations of call parameters determined at block 406. In yet another example, after block 412, the communications carrier system 112 may proceed to add the entries created at block 410 and/or block 412 to the toll-free database. In yet another example, if the owner of the toll-free number owns other toll-free numbers, the communications carrier system 112 may proceed to manage the tables associated with those toll-free numbers. In yet another embodiment, instead of uploading the created entries onto the toll-free database, the communications carrier system 112 waits until the next upload period. For example, the communications carrier system 112 may cause the created entries to be uploaded every month, every quarter, every year, or any other period of time. In yet another embodiment, the communications carrier system 112 may be configured to detect an outage and update the table associated with the toll-free number accordingly. For example, if the communications carrier system 112 detects that it is not receiving any calls from the Carrier A circuit to the toll-free number, the communications carrier system 112 may update the table associated with the toll-free number by replacing Carrier A with another carrier that may provide some of the benefits described herein. The communications carrier system 112 may maintain an ordered set of the most voluminous areas and use the set in the case of an outage in order to redirect as many of the affected people as possible. Further, the communications carrier system 112 may run a specific report that is triggered by the detected outage, so that the effect of the outage can be minimized right away, even if a report is not scheduled to run in the near future. After running the specific report, the communications carrier system 112 may update the toll-free database 108 such that no calls are routed to the affected carrier (e.g., by uploading a pre-generated template excluding the affected carrier, by generating and uploading a new combination of call parameters based on the remaining carriers, or both). In yet another embodiment, the communications carrier system 112 may pre-optimize a certain area in anticipation of getting calls from such an area in the future. For example, the communications carrier system 106 may have information regarding a campaign that the owner of the toll-free number will be having in Texas, and based on the information, optimize one or more areas within Texas even if the historical call data did not have any calls originating from Texas. Thus, the embodiments of the present disclosure are not limited to or by the example shown in FIG. 4, and other variations may be implemented without departing from the spirit of this disclosure.

Example Call Routing Process

Figure 5:
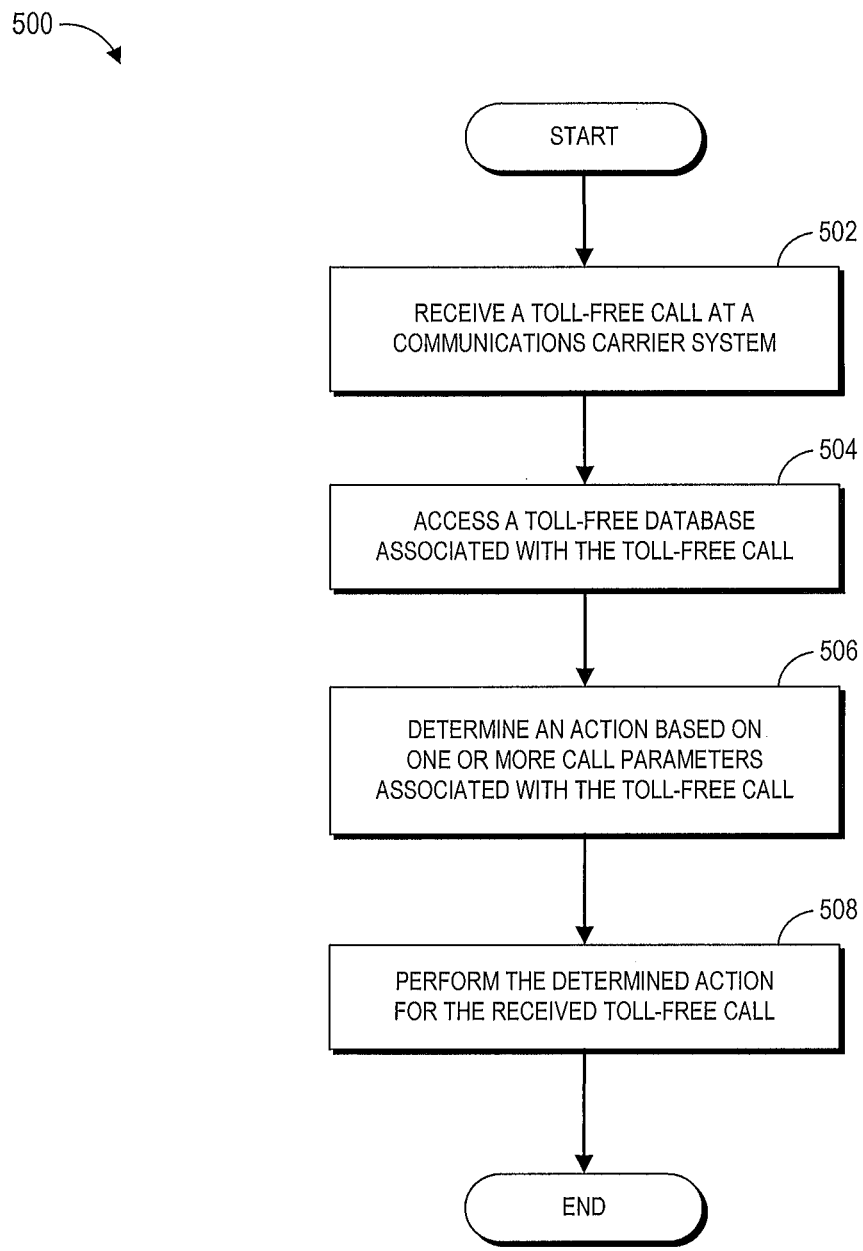
FIG. 5 illustrates a flow diagram for one embodiment of a call routing process in accordance with the teachings of the present disclosure.

FIG. 5 illustrates a flow diagram for one embodiment of a call routing process 500 in accordance with some teachings of the present disclosure. The process 500 can be performed by any system capable of routing a call including a communications carrier system 106 that initially received a call from the origin caller 102, a communications carrier system 112 that completed the final call connection to the destination caller 104, or a communications carrier system somewhere in between. In one embodiment, a call routing module associated with the communications carrier system can perform the process 500. To simplify discussion, the process 500 will be described as being performed by the communications carrier system 106 of FIG. 1.

The process begins at block 502 when, for example, the communications carrier system 106 receives a call to a toll-free number. In one embodiment, the call routing module 106B receives the call. At block 504, the communications carrier system 106 accesses the toll-free database 108. In one embodiment, the call routing module 106B accesses a table associated with the toll-free number within the toll-free database 108.

At block 506, the communications carrier system 106 determines how to process the call to the toll-free number. For example, based on the response from the toll-free database 108, the communications carrier system 106 may determine whether the call should be routed to a particular number via a particular carrier or whether an announcement (e.g., "This number is not in service.") should be sent back to the origin caller 102. For example, the communications carrier system 106 may determine that the call should be handled by the communications carrier system 106 and route the call, based on its customer records, to the destination caller 104. If the communications carrier system 106 determines that the call should be handled by another communications carrier system, the communications carrier system 106 routes the call to such a communications carrier system. At block 510, the communications carrier system 106 performs the determined action, and the process 500 ends.

In the process 500, one or more of the blocks shown in FIG. 5 may be removed (e.g., not performed), modified, the order in which the process is performed may be switched, and/or one or more additional blocks may be added. For example, after receiving the call, the call routing module 106B may determine whether the call is made to a toll-free number, the process 500 may proceed to block 504 only if the call is made to a toll-free number. Thus, the embodiments of the present disclosure are not limited to or by the example shown in FIG. 5, and other variations may be implemented without departing from the spirit of this disclosure.

Other Implementation Details

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as application-specific electronic hardware, computer software executed by computer hardware, or a combination of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the communications carrier system 112 of FIG. 1 may be implemented in an appropriate combination of computer hardware and software. For instance, each module 112A and 106B can be implemented as a respective general or special purpose computer or computer system programmed with executable code. Alternatively, the modules 112A and 106B can be implemented, in whole or in part, by the same computer or computer system. Moreover, the described functionality can be implemented in varying ways for each particular application of the systems described herein, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method for maintaining a database used during call routing, the method comprising:
    by a database management system comprising computer hardware,
        establishing a network connection to a database host system using a communications protocol, wherein the database host system is configured to provide an application programming interface (API) for updating a database hosted by the database host system, the database comprising a set of tables associated with a set of corresponding call destinations, wherein each table includes one or more routing entries, wherein each routing entry included in a table specifies one or more values to be used for routing calls made to a corresponding call destination associated with the table, wherein the database comprises a first table associated with a first call destination in the set of corresponding call destinations;

accessing historical call data associated with the first call destination and carrier data associated with a plurality of telecommunications carriers;

generating, based at least in part on the historical call data and the carrier data, a set of combinations of one or more values configured to route calls made to the first call destination;

determining whether the generated set of combinations can be included in the first table associated with the first call destination without exceeding a size limit of the first table;

in response to determining that the generated set of combinations cannot be included in the first table without exceeding the size limit of the first table:
selecting a subset of combinations from the set of combinations to be merged such that a number of telecommunications carriers used for routing calls made to the first call destination satisfies a threshold condition indicative of a number of call handoffs between telecommunications carriers; and merging the selected subset of combinations into a merged subset such that the merged subset and one or more remaining combinations in the set of combinations can be included in the first table without exceeding the size limit of the first table associated with the first call destination; and using the API for updating the database to cause the merged subset to be included in the first table associated with the first call destination such that calls made to the first call destination are routed using the merged subset, wherein updates to the database periodically occur during an update time period, and wherein updating the database comprises scheduling an update to occur during the update time period; and by a call routing system comprising computer hardware, detecting a first call from a call origin to the first call destination;

determining that the first table of the database stores an entry specifying a routing path from the call origin to the first call destination; and routing the first call from the call origin to the first call destination by:
prior to updating the database to cause the merged subset to be included in the first table associated with the first call destination, routing the first call through a first combination of telecommunications carriers specified by the entry, a number of telecommunications carriers in the first combination of telecommunications carriers exceeding the threshold condition indicative of the number of call handoffs between telecommunications carriers; and subsequent to updating the database to cause the merged subset to be included in the first table associated with the first call destination, routing the first call through a second combination of telecommunications carriers specified by the entry subsequent to the entry being updated to store the merged subset, a number of telecommunications carriers in the second combination of telecommunications carriers not exceeding the threshold condition indicative of the number of call handoffs between telecommunications carriers, wherein call quality is improved when the call is routed through the second combination of telecommunications carriers and not through the first combination of telecommunications carriers.

2. The method of claim 1, wherein the one or more values comprise one or more of a local access and transport area (LATA), an area code, an area code prefix, a 10 digit number, a day of week, a day of year, a time of day, a telecommunications carrier, an announcement, and a redirect phone number.

3. The method of claim 1, wherein the carrier data includes carrier mapping data mapping a plurality of regions to the plurality of corresponding telecommunications carriers.

4. The method of claim 1, wherein the carrier data includes carrier metric data associated with a plurality of telecommunications carriers, the carrier metric data for a given telecommunications carrier indicative of a metric associated with routing a second call from an origin caller to a destination caller via the given telecommunications carrier.

5. The method of claim 1, further comprising:
selecting a first subset of combinations and a second subset of combinations to be merged from the set of combinations;

merging the first subset without merging the second subset and calculating a corresponding first number of telecommunications carriers used for routing the calls made to the first call destination;

merging the second subset without merging the first subset and calculating a corresponding second number of telecommunications carriers used for routing the calls made to the first call destination; and based at least in part on a determination that the first number is greater than the second number, causing the set of combinations including the merged second subset to be included in the first table associated with the first call destination.

6. The method of claim 1, further comprising:
selecting a first subset of combinations and a second subset of combinations to be merged from the set of combinations;

merging the first subset without merging the second subset and calculating a corresponding first number of telecommunications carriers used for routing the calls made to the first call destination;

merging the second subset without merging the first subset and calculating a corresponding second number of telecommunications carriers used for routing the calls made to the first call destination;

based at least in part on a determination that the first number is equal to the second number, calculating (i) a first amount of projected resource consumption associated with merging the first subset and not the second subset and (ii) a second amount of projected resource consumption associated with merging the second subset and not the first subset; and based at least in part on a determination that the second amount is greater than the first amount, causing the set of combinations including the merged first subset to be included in the first table associated with the first call destination.

7. The method of claim 1, wherein the historical call data comprises call data generated within a time period selected from at least one of a past hour, past 24 hours, a past week, a past month, a past year, since a specified time, or since a registration time of the first call destination.

8. The method of claim 1, wherein the first combination of telecommunications carriers specified by the entry is associated with one or more default routing parameters for routing the first call.

9. The method of claim 1, further comprising:
selecting a first combination from the set of combinations;
splitting the first combination into a first group of combinations and calculating a corresponding first number of telecommunications carriers used for routing the calls made to the first call destination, wherein the set of combinations including the first group of combinations does not exceed the size limit;
splitting the first combination into a second group of combinations different from the first group and calculating a corresponding second number of telecommunications carriers used for routing the calls made to the first call destination, wherein the set of combinations including the second group of combinations does not exceed the size limit; and
based at least in part on a determination that the first number is greater than the second number, causing the set of combinations including the second group of combinations to be included in the first table associated with the first call destination.

10. The method of claim 1, wherein selecting the subset of combinations from the set of combinations to be merged comprises:
determining from the historical call data at least one of a number of calls or length of calls from a plurality of call origins to the first call destination;
including a first telecommunications carrier in the subset of combinations in response to determining from the at least one of the number of calls or lengths of calls from the plurality of call origins to the first call destination that routing calls from the plurality of call origins to the first call destination through the first telecommunications carrier satisfies the threshold condition indicative of a number of calls handoffs between telecommunications carriers while routing the calls from the plurality of call origins to the first call destination through a second telecommunications carrier does not satisfy the threshold condition; and
excluding the second telecommunications carrier from the subset of combinations.

11. A system for maintaining a database for routing calls, the system comprising:
a data store comprising historical call data associated with a plurality of call destinations and carrier data associated with a plurality of telecommunications carriers;
a database management server comprising computer hardware and in networked communication with the data store, the database management server configured to:
establish a network connection to a database host system using a communications protocol, wherein the database host system is configured to provide an application programming interface (API) for updating a database hosted by the database host system, the database comprising a set of tables associated with a set of corresponding call destinations, wherein each table includes one or more routing entries, wherein each routing entry included in a table specifies one or more values to be used for routing calls made to a corresponding call destination associated with the table, wherein the database comprises a first table associated with a first call destination in the set of corresponding call destinations;
access, from the data store, historical call data associated with the first call destination and carrier data associated with the plurality of telecommunications carriers;
generate, based at least in part on the historical call data and the carrier data, a set of combinations of one or more values configured to route calls made to the first call destination;
determine whether the generated set of combinations can be included in the first table associated with the first call destination without exceeding a size limit of the first table;
in response to a determination that the generated set of combinations cannot be included in the first table without exceeding the size limit of the first table:
select a subset of combinations from the set of combinations to be merged such that a number of telecommunications carriers used for routing calls made to the first call destination satisfies a threshold condition indicative of a number of call handoffs between telecommunications carriers; and
merge the selected subset of combinations into a merged subset such that the merged subset and one or more remaining combinations in the set of combinations can be included in the first table without exceeding the size limit of the first table associated with the first call destination; and
cause, using the API for updating the database, the merged subset to be included in the first table associated with the first call destination such that calls made to the first call destination are routed using the merged subset, wherein updates to the database periodically occur during an update time period, the database management server further configured to schedule an update during the update time period to cause the merged subset to be included in the first table of the database; and
a call routing system comprising computer hardware, the call routing system configured to:
detect a first call to the first call destination;
determine that the first table of the database stores an entry indicating a routing path to the first call destination; and
route the first call to the first call destination, the call routing system further configured to:
prior to the database being updated by including the merged subset in the first table associated with the first call destination, route the first call through a first combination of telecommunications carriers indicated by the entry, a number of telecommunications carriers in the first combination of telecommunications carriers not satisfying the threshold condition indicative of the number of call handoffs between telecommunications carriers; and
subsequent the database being updated by including the merged subset in the first table associated with the first call destination, route the first call through a second combination of telecommunications carriers indicated by the entry subsequent to the entry being updated, a number of telecommunications carriers in the second combination of telecommunications carriers satisfying the threshold condition indicative of the number of call handoffs between telecommunications carriers.

12. The system of claim 11, wherein the one or more values comprise one or more of a local access and transport area (LATA), an area code, an area code prefix, a 10 digit number, a day of week, a day of year, a time of day, a telecommunications carrier, an announcement, and a redirect phone number.

13. The system of claim 11, wherein the carrier data includes carrier mapping data mapping a plurality of regions to a plurality of corresponding telecommunications carriers.

14. The system of claim 11, wherein the carrier data includes carrier metric data associated with a plurality of telecommunications carriers, the carrier metric data for a given telecommunications carrier indicative of a metric associated with routing a second call from an origin caller to a destination caller via the given telecommunications carrier.

15. The system of claim 11, wherein the database management server is further configured to:
   select a first subset of combinations and a second subset of combinations to be merged from the set of combinations;
   merge the first subset without merging the second subset and calculate a corresponding first number of telecommunications carriers used for routing the calls made to the first call destination;
   merge the second subset without merging the first subset and calculate corresponding a second number of telecommunications carriers used for routing the calls made to the first call destination; and
   based at least in part on a determination that the first number is greater than the second number, cause the set of combinations including the merged second subset to be included in the first table associated with the first call destination.

16. The system of claim 11, wherein the database management server is further configured to:
   select a first subset of combinations and a second subset of combinations to be merged from the set of combinations;
   merge the first subset without merging the second subset and calculate a corresponding first number of telecommunications carriers used for routing the calls made to the first call destination;
   merge the second subset without merging the first subset and calculate a corresponding second number of telecommunications carriers used for routing the calls made to the first call destination;
   based at least in part on a determination that the first number is equal to the second number, calculate (i) a first amount of projected resource consumption associated with merging the first subset and not the second subset and (ii) a second amount of projected resource consumption associated with merging the second subset and not the first subset; and
   based at least in part on a determination that the second amount is greater than the first amount, cause the set of combinations including the merged first subset to be included in the first table associated with the first call destination.

17. The system of claim 11, wherein the historical call data comprises call data generated within a time period selected from at least one of a past hour, past 24 hours, a past week, a past month, a past year, since a specified time, or since a registration time of the first call destination.

18. The system of claim 11, wherein the first combination of telecommunications carriers indicated by the entry is associated with one or more default routing parameters for routing the first call.

19. The system of claim 11, wherein the database management server is further configured to:
   select a first combination from the set of combinations;
   split the first combination into a first group of combinations and calculating a corresponding first number of telecommunications carriers used for routing the calls made to the first call destination, wherein the set of combinations including the first group of combinations does not exceed the size limit;
   split the first combination into a second group of combinations different from the first group and calculating a corresponding second number of telecommunications carriers used for routing the calls made to the first call destination, wherein the set of combinations including the second group of combinations does not exceed the size limit; and
   based at least in part on a determination that the first number is greater than the second number, cause the set of combinations including the second group of combinations to be included in the first table associated with the first call destination.

20. The system of claim 11, wherein the database management server is further configured to select the subset of combinations from the set of combinations to be merged by:
   determining from the historical call data at least one of a number of calls or length of calls from a plurality of call origins to the first call destination;
   including a first telecommunications carrier in the subset of combinations in response to determining from the at least one of the number of calls or lengths of calls from the plurality of call origins to the first call destination that routing calls from the plurality of call origins to the first call destination through the first telecommunications carrier satisfies the threshold condition indicative of a number of calls handoffs between telecommunications carriers while routing the calls from the plurality of call origins to the first call destination through a second telecommunications carrier does not satisfy the threshold condition; and
   excluding the second telecommunications carrier from the subset of combinations.

* * * * *

UNITED STATES PATENT AND TRADEMARK OFFICE
CERTIFICATE OF CORRECTION

PATENT NO. : 10,691,657 B2  
APPLICATION NO. : 15/465329  
DATED : June 23, 2020  
INVENTOR(S) : Christopher Fogel Page 1 of 1

It is certified that error appears in the above-identified patent and that said Letters Patent is hereby corrected as shown below:

In the Specification

In Column 17, Line 54, delete "communications'" and insert --communications--.

In the Claims

In Column 23, Line 64, Claim 1, after "the" insert --first--.

Signed and Sealed this  
Eighth Day of September, 2020

Andrei Iancu  
*Director of the United States Patent and Trademark Office*